United States Patent
Chao et al.

(10) Patent No.: US 7,490,025 B2
(45) Date of Patent: Feb. 10, 2009

(54) INTEGRATED CIRCUIT WITH SELF-PROOFREADING FUNCTION, MEASURING DEVICE USING THE SAME AND METHOD FOR SELF-RECORDING PARAMETER

(75) Inventors: Po-Yin Chao, Taipei Hsien (TW); Kuo-Yuan Yuan, Taipei Hsien (TW); Hsiang-Min Lin, Taipei Hsien (TW)

(73) Assignee: De Poan Pneumatic Corp., Taipei (TW)

( * ) Notice: Subject to any disclaimer, the term of this patent is extended or adjusted under 35 U.S.C. 154(b) by 108 days.

(21) Appl. No.: 11/465,561

(22) Filed: Aug. 18, 2006

(65) Prior Publication Data

US 2008/0046182 A1 Feb. 21, 2008

(51) Int. Cl.
*G06F 15/00* (2006.01)
*H03F 1/26* (2006.01)

(52) U.S. Cl. .................. 702/189; 702/118; 702/119; 702/120; 702/121; 709/212; 709/213; 711/100; 711/102; 711/103; 711/104; 711/105

(58) Field of Classification Search .................. 702/189, 702/118–121; 709/212, 213; 711/100, 102–105
See application file for complete search history.

(56) References Cited

OTHER PUBLICATIONS

ST Microelectronics ST62T32B/ST62E32B, 2003, Rev 2.8 pp. 1-83.*

* cited by examiner

*Primary Examiner*—Tung S Lau
*Assistant Examiner*—Sujoy K Kundu

(57) ABSTRACT

An integrated circuit (IC) with a self-proofreading function includes a micro control unit (MCU) and a one-time programmable (OTP) memory connected with the MCU. The OTP memory includes an instruction memory region for storing instructions and a parameter memory region for storing standard parameters for proofreading. The MCU computes a measured result according to the standard parameters. The IC can operate without an external memory, therefore, the proofreading procedure using the IC is simplified, and the cost of the terminal product using the IC can be reduced.

8 Claims, 3 Drawing Sheets

INTEGRATED CIRCUIT WITH SELF-PROOFREADING FUNCTION, MEASURING DEVICE USING THE SAME AND METHOD FOR SELF-RECORDING PARAMETER

BACKGROUND OF THE INVENTION

1. Field of the Invention

The present invention relates to an integrated circuit (IC) for measuring, an apparatus using the IC and a method for recording parameters in the IC.

2. Description of the Related Art

Currently, a conventional integrated circuit for measuring includes an analog digital converter (ADC), a micro control unit (MCU), a system memory, and so on. Furthermore, the MCU includes a random access memory (RAM), a central processing unit (CPU) and a programmable interface, etc.

When an integrated circuit is utilized in measuring devices, sensors for measuring pressures or weights are receiving measuring signals. The sensors convert the measuring signals to electrical signals, such as voltage signals or current signals. The electrical signals are converted into digital signals by the analog-to-digital converter of the integrated circuit. And then, the digital signals are computed, processed or further converted by the MCU, and are displayed on an external display. The MCU computes, processes or further converts the signals by an instruction set stored in the system memory. The total and order of the instructions construct a program.

However, in the above utilizations, many of the integrated circuits having an analog-to-digital converter must perform a proofreading process before displaying an accurate measuring value. In the proofreading process, a standard measuring object having standard values is used. A sensor communicates with the standard measuring object to send out a standard signal. The standard signal is converted to a digital signal used as a standard value to be stored in the memory. When the MCU performs a normal measuring program, the standard value is taken out to compute an actual measuring value according to a measuring signal. After the proofreading process, a proofreading coefficient is produced correspondingly. The proofreading coefficient must be stored and can be read by the MCU, so that the MCU can accurately perform a computation or a conversion to obtain an accurate value. Therefore, most of electrical elements require an electrically erasable programmable read-only memory (EEPROM) to store the proofreading coefficient.

However, an additional burner is needed to write the proofreading accurately in the EEPROM. After the step of writing, the EEPROM is taken out from the burner and is communicated with an electrical measuring device of a terminal system to finish the proofreading process.

At present, there may be some better methods for recording the proofreading parameters, and it's not necessary to take the EEPROM out of terminal system product as described above. Referring to FIG. 1, a conventional IC 100 is shown. The IC 100 is connected to a display 115, an EEPROM 105 and a sensor 101. Before performing a measuring program, the IC 100 must perform a proofreading procedure. The proofreading procedure includes the following steps: a first step of directly contacting the sensor 101 with a standard object (not shown), a second step of outputting a standard analogical signal to an ADC 103 by the sensor 101, a third step of outputting a standard digital signal to an MCU 109 by the ADC 103 according to the standard analogical signal, and a fourth step of storing standard parameters into an EEPROM 105 through a serial interface circuit 107 after processed by MCU 109. When the MCU 109 performs any instruction, the MCU must access instruction sets from the EPROM 111.

After finishing the proofreading procedure, the standard parameters are stored into the EEPROM 105. When a normal measuring procedure is performed, the sensor 101 directly contacts with an object to be measured and outputs a measuring signal to the ADC 103. After a step of transforming, the ADC 103 outputs a digital measuring signal to the MCU 109, and the MCU 109 reads the standard parameters form the EEPROM 105 through the serial interface circuit 107. After a step of computing, the MCU 109 outputs a measured result to the display 115 through a timing-controller 113. The MCU 109 must compute the measured result according to the standard parameters stored in the EEPROM 105. The MCU 109 must use the serial interface circuit 107 to access the standard parameters. The EEPROM 105 is externally connected to the IC 100. The above way of storing the standard parameters into an external memory has an advantage that the EEPROM 105 is easily accessed, but it increases a cost of the whole measuring system. In addition, when the proofreading procedure is performed or the program memory is recorded, terminal system products need two extra voltage source VPP=12 volt and VDD=5.8 volt, except for a normal chip power source.

What is needed is to provide an IC with a simple proofreading procedure, a low cost and having a self-proofreading function.

BRIEF SUMMARY

An integrated circuit (IC) with a self-proofreading function includes a micro control unit (MCU) and a one-time programmable (OTP) memory connected with the MCU. The OTP memory comprises an instruction memory region for storing instructions and a parameter memory region for storing standard parameters for proofreading. The MCU computes a measured result according to the standard parameters.

The IC further includes an analog digital converter (ADC) connected to the MCU and the ADC is used for receiving measured signals and converting the measured signals to digital signals. The IC further includes a timing controller connected to the MCU and the MCU outputs a measured result by the timing controller.

In the IC, the instructions stored in the OTP memory have proofreading instructions and measuring instructions for enabling the IC operate under a proofreading mode and a measuring mode, respectively. The MCU accesses standard parameters and instructions from the OTP memory.

The IC further includes an electrical charge pump and a switching circuit. The electrical charge pump has an output port and an enable port connected to the MCU. The switching circuit has a control port connected to the MCU, a first input port connected to the output port of the electrical charge pump, a second input port connected to a power source of the MCU and an output port connected to the OTP memory to provide an operating voltage and a recording voltage for the OTP memory.

A measuring apparatus with a self-proofreading function includes a sensor, and an integrated circuit (IC). The IC includes a micro control unit (MCU) for receiving digital signals, an analog digital converter (ADC) connected to the MCU, and a one-time programmable (OTP) memory connecting with the MCU. The ADC is used for receiving measured signals from the sensor and converting the measured signals to digital signals. The OTP memory includes an instruction memory region for storing instructions and a parameter memory division to store standard parameters for proofreading. The MCU computes the measured result corresponding to the digital signals, according to the standard parameters.

In the measuring apparatus, the IC further includes a timing controller connected to the MCU and the MCU outputs a measured result by the timing controller.

The IC further includes an electrical charge pump and a switching circuit. The electrical charge pump has an output port and an enable port connected to the MCU. The switching circuit has a control port connected to the MCU a first input port connected to the output port of the electrical charge pump, a second input port connected to a power source of the MCU, and an output port connected to the OTP memory to provide an operating voltage and a recording voltage for the OTP memory.

The present invention provides a method of self-recording parameters in an integrated circuit (IC), including the steps of:
(a) setting a parameter memory region in a one-time programmable (OTP) memory of the IC, and the OTP memory having recorded instructions;
(b) executing the instructions in the OTP memory under a self-proofreading mode; and
(c) recording a standard parameter into the parameter memory region.

In the method of self-recording parameters in an IC, the step (b) further includes a step for enhancing an operating voltage of the OTP memory to become a recording voltage when the standard parameters are recorded.

In the method of self-recording parameters in an IC, the parameter memory region is divided into many sub-regions for recording different kinds of standard parameters or recording standard parameters for proofreading at many times.

In the method of self-recording parameters in an IC, the standard parameter is obtained by a sensor measuring a standard object and outputting a measured signal, and after that, the measured signal being converted to a digital signal by an analog digital converter (ADC).

In the method of self-recording parameters in an IC, the instructions recorded in the OTP memory includes proofreading instructions and measuring instructions for enabling the IC operate under a proofreading mode and a measuring mode, respectively.

In the method of self-recording parameters in an IC, the step (b) further includes the steps of: accessing the standard parameter, searching storing addresses in the parameter memory region, and confirming the address being void, and recording the standard parameter in the parameter memory region. The recording voltage is obtained by enhancing a power source voltage of the IC directly.

According to the above description, the IC can operate without an external memory such as EEPROM, and thus, the amount of elements of a terminal electronic measuring apparatus is reduced, and the cost of the terminal electronic measuring apparatus is reduced. Because the IC can record proofreading parameters by itself, after finishing manufacturing the terminal product using the IC, the terminal product can proofread by itself. The manufacturer of the terminal product using the IC doesn't need an external memory to record proofreading parameters before produce the terminal product. And the manufacturer of the terminal product doesn't need to proofread different kinds of parameters according to different kinds of applications beforehand. Therefore, the proofreading procedure is simplified, and the cost of the terminal product using the IC can be reduced.

As described above, the parameter memory region of the OTP memory can be divided to many sub-divisions, each of which can be used for recording a standard parameter for proofreading at one-time. Therefore, the OTP memory of the IC can record proofreading parameters at many times. The IC is more flexibly applied.

As the above description, because an electric charge pump is provide in the IC, the terminal system product doesn't need an external power source to provide a voltage being 5.8 volts. Therefore, the IC can reduce an external power source when standard parameters are recorded, and thus a power consuming of the IC can be reduced.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe embodiments of the present invention, in detail.

Figure 1:
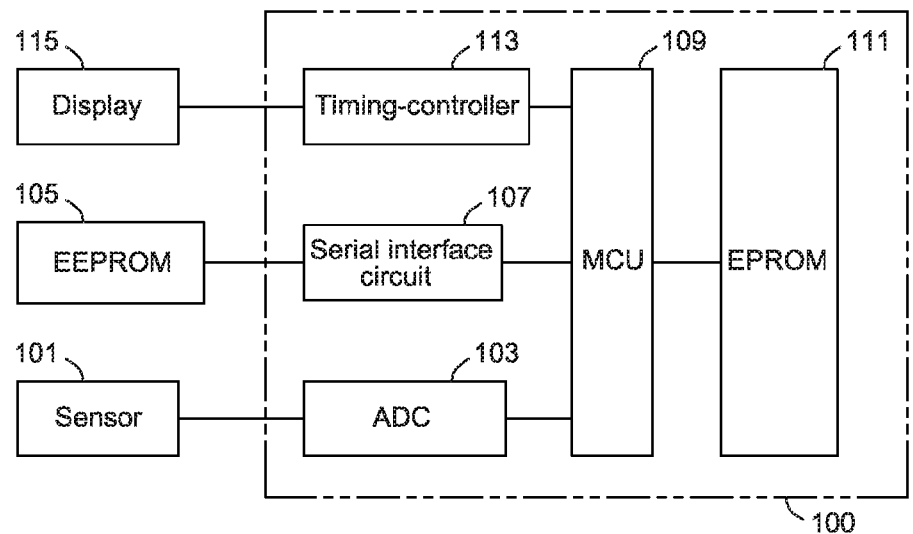
FIG. 1 shows a schematic view of a conventional integrated circuit (IC)
Figure 2:
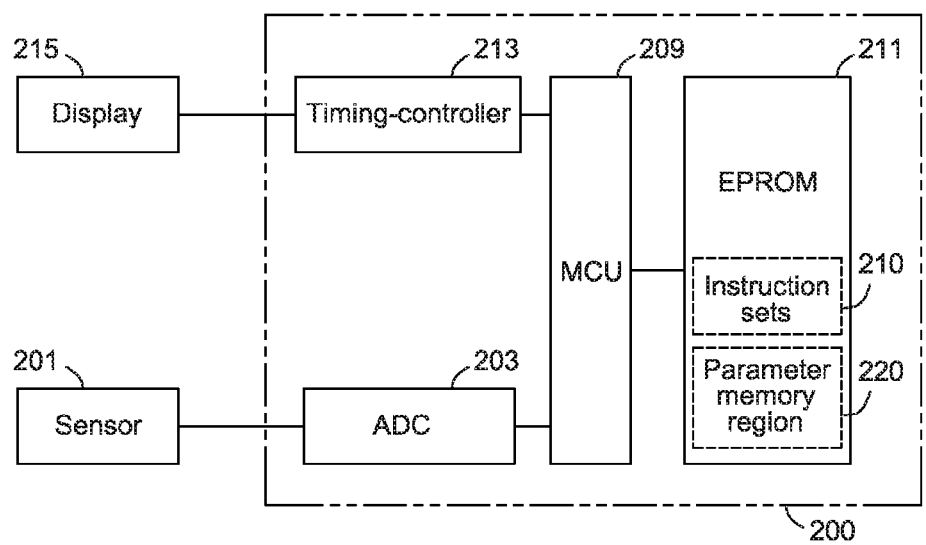
FIG. 2 shows a schematic block diagram of a measuring apparatus in accordance with a first embodiment of the present invention.

FIG. 2 illustrates a schematic block diagram of a measuring apparatus with a one-time programmable memory (OTP memory) in accordance with a first embodiment of the present invention. The measuring apparatus includes an integrated circuit (IC) 200, a sensor 201 and a display 215. The sensor 201 outputs a measuring signal to the IC 200. The IC 200 outputs a measuring result of an object to be measured to the display 215. In a proofreading procedure, the sensor 201 contacts with a standard object and outputs a standard signal to an analog digital converter (ADC) 203 of the IC 200. The standard signal is analogical signal and is converted to a digital signal by the ADC 203. A micro control unit (MCU) 209 processes the digital signal to get a standard parameter, which can be stored in a parameter memory region 220 of an erasable programmable read-only memory (EPROM) 211. According to this embodiment of the present invention, the parameter memory region 220 is a part of the EPROM 211. The MCU 209 can access standard parameters and instructions 210 from the EPROM 211 directly. When the MCU 209 executes a computing function, the MCU 209 can access instructions from the EPROM 211 to perform.

According to another embodiment of the present invention, the EPROM 211 can be replaced by a one-time programmable memory (OTP memory). Because data stored in the memory needn't to be deleted, it is feasible to replace the EPROM 211 with the OTP memory.

According to the first embodiment of the invention, the sensor 201 can measure some physical parameters, such as a temperature, a voltage, a water pressure, an electrical current, a liquid flow rate, and so on. The sensor 201 outputs a measured analogical signal after measuring the physical parameters.

When the IC 200 executes a normal measuring procedure, the sensor 201 directly contacts the object to be measured and outputs a measured signal to the ADC 203. The ADC 203 converts the measured signal to a digital measured signal and outputs the digital measured signal to the MCU 209. The MCU 209 accesses standard parameters from the parameter memory region 220 of the EPROM 211 and computes a measured result according to the standard parameters. The measured result is sent to the display 215 to display via a timing controller 213. According to the first embodiment of the invention, the standard parameters for the proofreading procedure are stored in an inside memory region, and thus, the MCU 209 can access the standard parameters from the EPROM without accessing an outside EPROM. The MCU 209 can directly access instructions and standard parameters from the EPROM 211 to execute the proofreading procedure and the measuring procedure, and thus, the serial interface circuit can be cut off and the operating speed of the IC 200 is enhanced. On the other hand, the standard parameters are stored in the EPROM 211, and the MCU 209 can access the standard parameters from the EPROM 211. Therefore, the measuring system using the IC 200 does not need to use an external EPROM, and a cost of the measuring system is reduced.

Figure 3:
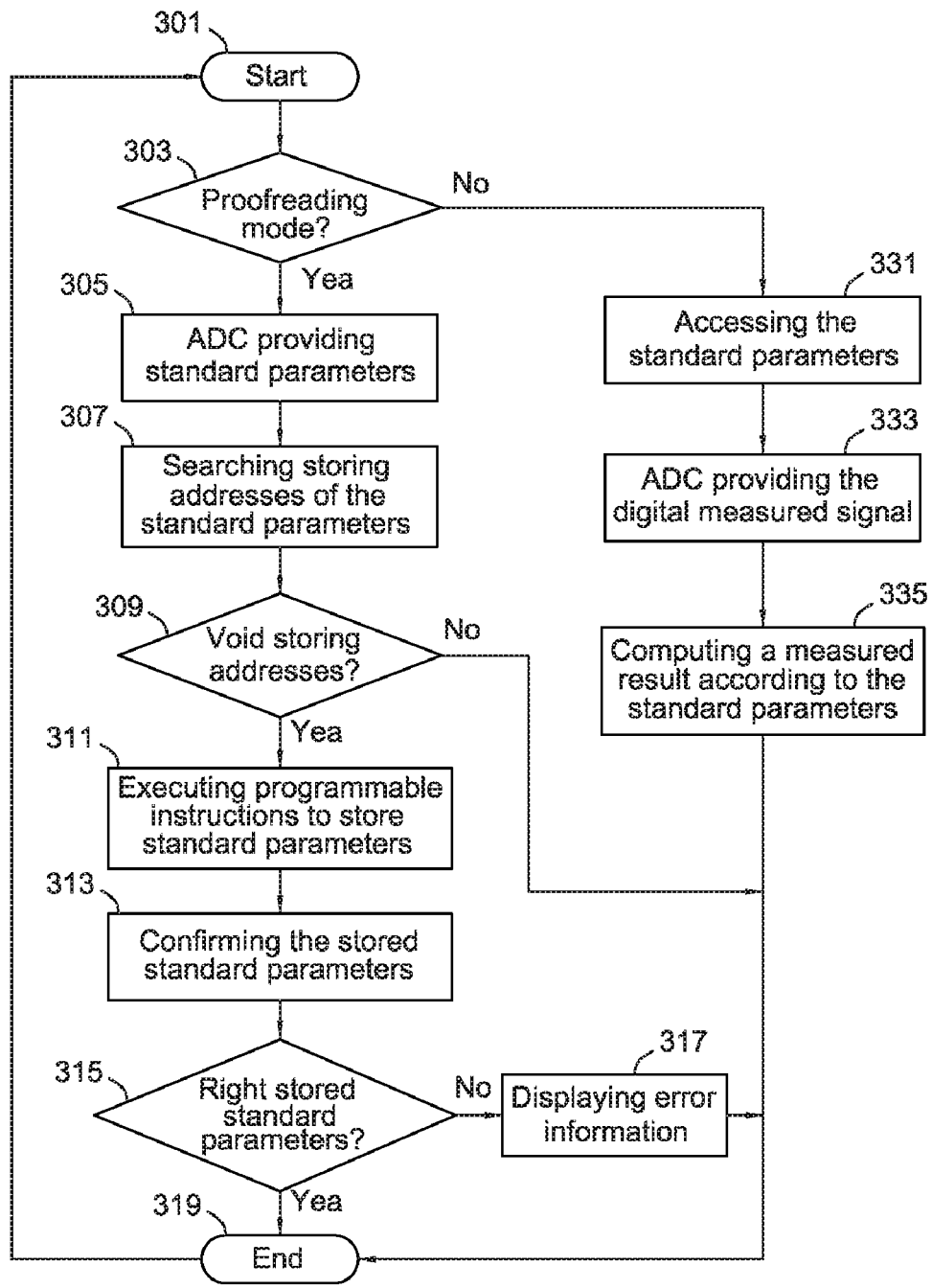
FIG. 3 is a flowchart of a proofreading procedure according to the measuring apparatus of FIG. 2.

FIG. 3 is a flowchart of the proofreading procedure and the measuring procedure according to the measuring apparatus of FIG. 2. In a step 301, the IC 200 starts to work. In a step 303, it is determined whether or not the IC 200 is operating under a proofreading mode. If it is, the proofreading procedure jumps to a step 305; if it is not, the proofreading procedure jumps to a step 331. In the step 305, the ADC 203 provides standard parameters to the MCU 209. In a next step 307, the MCU 209 searches storing addresses of the standard parameters in the EPROM 211. In a next step 309, the MCU 209 determines whether the storing addresses are void, and whether the standard parameters have been stored in the storing addresses. If the storing addresses are void, the proofreading procedure jumps to a step 311. If the standard parameters have been stored in the storing addresses, the proofreading procedure jumps to a step 319, and the self-proofreading procedure is ended. In the step 311, the MCU 209 executes programmable instructions to store standard parameters in the EPROM 211. After the step 311, the MCU 209 has to confirm the stored standard parameters in a step 313. In a next step 315, it is to determine whether the stored standard parameters are right. If it is, the proofreading procedure jumps to the step 319, and the self-proofreading procedure is ended. If it is not, the proofreading procedure jumps to the step 317 to display error information. After that, the proofreading procedure jumps to the step 319, and the self-proofreading procedure is ended.

When judging whether or not the IC 200 is operating under a proofreading mode, if it is not, the step 311 is executed, and the IC 200 begins to execute the measuring mode. In the step 331, the MCU 209 accesses the standard parameters from the EPROM 211. In a next step 333, the MCU 209 receives the digital measured signal from the ADC 203. After the step 333, the MCU 209 computes a measured result according to the standard parameters in a step 335. Finally, The step 319 is executed, and the measuring mode is ended.

According to the above embodiments of the present invention, when the IC 200 uses the OTP memory 211, the parameter memory region 220 can be divided into many sub-regions, each of which can be utilized to store standard parameters at one-time under a proofreading mode. Therefore, the IC 200 can record many times in the OTP memory.

Figure 4:
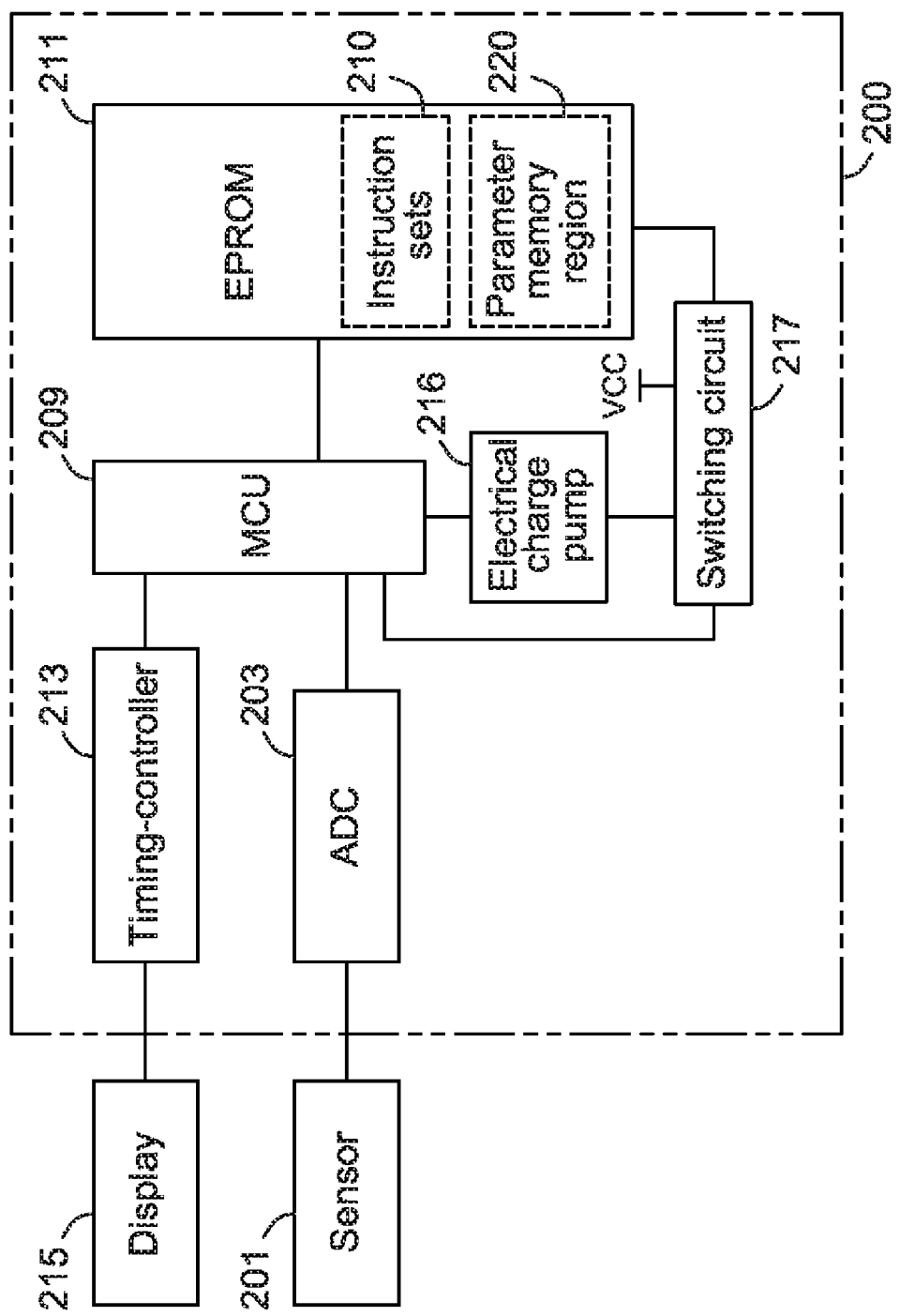
FIG. 4 is a schematic block diagram of a measuring apparatus in accordance with a second embodiment of the present invention.

FIG. 4 is a diagram describing the measuring apparatus in accordance with a second embodiment of the present invention. In this embodiment, the IC 200 uses an electrical charge pump 216 to enhance a voltage of the system power and supply an enhanced voltage to record standard parameters under a proofreading mode. Under the proofreading mode, when proofreading instructions record standard parameters into the parameter memory region 220 of the OTP memory 211, the MCU 209 outputs an enabling signal to enable the electric charge pump 216, and chooses an output voltage of the electric charge pump 216 by a switching circuit 217. The output voltage is provided to the OTP memory 211. For example, if the power voltage of the IC 200 is 3 volts, after being enhanced, the IC 200 can generate a voltage being 6 volts. Therefore, the terminal system products don't need to connect an external power source with an output voltage being 5.8-volts. That is, the IC 200 can reduce an external power source when standard parameters are recorded, and thus the power consuming of the IC 200 is reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An integrated circuit (IC) with a self-proofreading function, comprising:
   a micro control unit (MCU);
   a one-time programmable (OTP) memory connected with the MCU, the OTP memory comprising an instruction memory region for storing instructions, and a parameter memory region for storing standard parameters;
   an electrical charge pump and a switching circuit, wherein the electrical charge pump has an output port and an enable port connected to the MCU, and the switching circuit has a control port connected to the MCU; and
   a first input port connected to the output port of the electrical charge pump, a second input port connected to a power source of the MCU, and an output port connected to the OTP memory to provide an operating voltage and a recording voltage for the OTP memory,
   wherein the MCU computes a measured result according to the standard parameters.

2. The IC of claim 1, further comprising an analog digital converter (ADC) connected to the MCU, wherein the ADC is used for receiving measured signals and converting the measured signals to digital signals.

3. The IC of claim 1, wherein the instructions stored in the OTP memory has proofreading instructions and measuring instructions for enabling the IC operate under a proofreading mode and a measuring mode, respectively.

4. The IC of claim 1, further comprising a timing controller connected to the MCU, wherein the MCU outputs a measured result by the timing controller.

5. The IC of claim 1, the MCU accesses standard parameters and instructions from the OTP memory.

6. A measuring apparatus with a self-proofreading function, comprising a sensor; and an integrated circuit (IC), the IC comprising:
   a micro control unit (MCU) for receiving digital signals;

an analog digital converter (ADC) connected to the MCU, the ADC being used for receiving measured signals from the sensor and converting the measured signals to digital signals; and a one-time programmable (OTP) memory connecting with the MCU, the OTP memory comprising an instruction memory region for storing instructions and a parameter memory division for storing standard parameters;

an electrical charge pump and a switching circuit, wherein the electrical charge pump has an output port and an enable port connected to the MCU, and the switching circuit has a control port connected to the MCU; and a first input port connected to the output port of the electrical charge pump, a second input port connected to a power source of the MCU, and an output port connected to the OTP memory to provide an operating voltage and a recording voltage for the OTP memory;

wherein the MCU computes the measured result corresponding to the digital signals, according to the standard parameters.

7. The measuring apparatus of the claim 6, further comprising a timing controller connected to the MCU, wherein the MCU outputs a measured result by the timing controller.

8. The measuring apparatus of the claim 6, wherein the instructions stored in the OTP memory has proofreading instructions and measuring instructions for enabling the IC operate under a proofreading mode and a measuring mode, respectively.

* * * * *

UNITED STATES PATENT AND TRADEMARK OFFICE
CERTIFICATE OF CORRECTION

PATENT NO. : 7,490,025 B2
APPLICATION NO. : 11/465561
DATED : February 10, 2009
INVENTOR(S) : Po-Yin Chao It is certified that error appears in the above-identified patent and that said Letters Patent is hereby corrected as shown below:

On the title page, item [73]:

Assignee: De Poan Pneumatic Corp., Taipei (TW)

should be

Assignee: FORTUNE SEMICONDUCTOR CORPORATION, Taipei (TW)

"De Poan Pneumatic Corp." was wrong and --FORTUNE SEMICONDUCTOR CORPORATION-- is correct.

Signed and Sealed this

Twentieth Day of October, 2009

David J. Kappos
*Director of the United States Patent and Trademark Office*